United States Patent
Zhang et al.

(10) Patent No.: US 11,553,401 B2
(45) Date of Patent: Jan. 10, 2023

(54) SERVING NODE UPDATE METHOD AND DEVICE

(71) Applicant: VIVO MOBILE COMMUNICATION CO., LTD., Guangdong (CN)

(72) Inventors: Yanxia Zhang, Chang'an Dongguan (CN); Yumin Wu, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 77 days.

(21) Appl. No.: 17/157,740

(22) Filed: Jan. 25, 2021

(65) Prior Publication Data

US 2021/0144621 A1    May 13, 2021

Related U.S. Application Data

(63) Continuation of application No. PCT/CN2019/097476, filed on Jul. 24, 2019.

(30) Foreign Application Priority Data

Jul. 26, 2018    (CN) .......................... 201810835732.0

(51) Int. Cl.
*H04W 48/08* (2009.01)
*H04W 76/15* (2018.01)

(52) U.S. Cl.
CPC ............ *H04W 48/08* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 9,699,702 B2* | 7/2017 | Fujishiro | H04W 36/28 |
| 2014/0335882 A1* | 11/2014 | Lee | H04W 76/15 |
| | | | 455/452.2 |
| 2015/0045035 A1* | 2/2015 | Nigam | H04W 72/1268 |
| | | | 455/436 |
| 2015/0350964 A1 | 12/2015 | Lin et al. | |
| 2016/0227459 A1 | 8/2016 | Fujishiro et al. | |

(Continued)

FOREIGN PATENT DOCUMENTS

| | | |
|---|---|---|
| CN | 104185227 A | 12/2014 |
| CN | 104822169 A | 8/2015 |

(Continued)

OTHER PUBLICATIONS

Japanese Office Action dated Mar. 1, 2022 as received in application No. 2021-504367.

(Continued)

*Primary Examiner* — Hong S Cho
(74) *Attorney, Agent, or Firm* — Maschoff Brennan

(57) ABSTRACT

Embodiments of this disclosure provide a serving node update method and a device. The method includes: sending a first message to a target node; receiving, from the target node, a second message used for responding to the first message; and sending a third message to a terminal device when the second message indicates that the target node rejects a multi-connectivity serving node update, where the third message is used to indicate the terminal device to perform a serving node update in a legacy serving node update manner.

20 Claims, 13 Drawing Sheets

(56) References Cited

U.S. PATENT DOCUMENTS

| | | |
|---|---|---|
| 2016/0270142 A1 | 9/2016 | Olsson et al. |
| 2017/0048692 A1 | 2/2017 | Huang et al. |
| 2017/0181044 A1 | 6/2017 | Wen et al. |
| 2018/0092014 A1 | 3/2018 | Gao et al. |

FOREIGN PATENT DOCUMENTS

| | | |
|---|---|---|
| CN | 106162774 A | 11/2016 |
| EP | 2983407 A1 | 2/2016 |
| EP | 3 101 948 A1 | 12/2016 |
| EP | 3 146 760 A1 | 3/2017 |
| KR | 2015-0030505 A | 3/2015 |
| WO | 2015115621 A1 | 8/2015 |

OTHER PUBLICATIONS

Chinese Office Action dated Jun. 22, 2020 as received in application No. 201810835732.0.
"TP for Handover enhancement for dual connectivity" 3GPP TSG-RAN WG3 Meeting #87 R3-150398 Athens, Greece, Feb. 9-13, 2015. Nokia.
Kyocera Corp., "Deployment scenario for inter-MeNB handover," 3GPP TSG RAN WG3 Meeting #87, R3-150286, pp. 1-4, (Feb. 9, 2015).
Extended European Search Report dated Sep. 23, 2021 as received in Application No. 19840943.5.

\* cited by examiner

SERVING NODE UPDATE METHOD AND DEVICE

CROSS-REFERENCE TO RELATED APPLICATIONS

This application is a continuation of PCT Application No. PCT/CN2019/097476 filed on Jul. 24, 2019, which claims priority to Chinese Patent Application No. 201810835732.0 in China on Jul. 26, 2018, which is incorporated herein by reference in its entirety.

TECHNICAL FIELD

Embodiments of this disclosure relate to the field of communications technologies, and specifically to a serving node update method and a device.

BACKGROUND

At present, in a serving node update procedure supported in a protocol, for example, a serving node switching procedure or a serving node change procedure, a radio resource control (RRC) connection between a terminal device and a source node needs to be disconnected before the terminal device establishes a new RRC connection with a target node, and therefore user-plane data is interrupted in such a serving node update manner.

With evolution of technologies, a serving node update can be implemented based on a multi-connectivity capability of the terminal device. In such a multi-connectivity-based serving node update manner, it is ensured that the terminal device does not need to disconnect the RRC connection from the source node during the serving node update. After the serving node update is performed successfully, the terminal device disconnects the RRC connection from the source node, ensuring uninterrupted user-plane data.

However, in some scenarios, for example, the target node does not support the multi-connectivity serving node update manner or the target node rejects the multi-connectivity serving node update based on consideration of load conditions. How to perform the serving node update is an urgent problem to be resolved.

SUMMARY

An objective of embodiments of this disclosure is to provide a serving node update method and a device, so as to resolve the problem of how to perform a serving node update when a target node rejects multi-connectivity serving node update.

According to a first aspect, a serving node update method is provided, applied to a first node, where the first node is a source node or a master node, and the method includes:

sending a first message to a target node;

receiving, from the target node, a second message used for responding to the first message; and sending a third message to a terminal device when the second message indicates that the target node rejects a multi-connectivity serving node update, where the third message is used to indicate the terminal device to perform a serving node update in a legacy serving node update manner.

According to a second aspect, a serving node update method is further provided, applied to a target node, where the method includes:

receiving a first message from a first node, where the first node is a source node or a master node; and sending, to the first node, a second message used for responding to the first message, where when the second message indicates that the target node rejects a multi-connectivity serving node update, the first node is enabled to send a third message to a terminal device, and the third message is used to indicate the terminal device to perform a serving node update in a legacy serving node update manner.

According to a third aspect, a serving node update method is further provided, applied to a terminal device, where the method includes:

receiving a third message from a first node when a target node rejects a multi-connectivity serving node update, where the third message is used to indicate the terminal device to perform a serving node update in a legacy serving node update manner; and performing a serving node update in the legacy serving node update manner according to the third message.

According to a fourth aspect, a first node is further provided, where the first node is a source node or a master node, and includes:

a first transmitting module, configured to send a first message to a target node;

a first receiving module, configured to receive, from the target node, a second message used for responding to the first message; and a second transmitting module, configured to send a third message to a terminal device when the second message indicates that the target node rejects a multi-connectivity serving node update, where the third message is used to indicate the terminal device to perform a serving node update in a legacy serving node update manner.

According to a fifth aspect, a target node is further provided, including:

a third receiving module, configured to receive a first message from a first node, where the first node is a source node or a master node; and a fourth transmitting module, configured to send, to the first node, a second message used for responding to the first message, where when the second message indicates that the target node rejects a multi-connectivity serving node update, the first node is enabled to send a third message to a terminal device, and the third message is used to indicate the terminal device to perform a serving node update in a legacy serving node update manner.

According to a sixth aspect, a terminal device is further provided, including:

a fourth receiving module, configured to: receive a third message from a first node when a target node rejects a multi-connectivity serving node update, where the third message is used to indicate the terminal device to perform a serving node update in a legacy serving node update manner; and a processing module, configured to perform a serving node update in the legacy serving node update manner according to the third message.

According to a seventh aspect, a network device is further provided, including a processor, a memory, and a computer program stored in the memory and capable of running on the processor, where the computer program is executed by the processor, the steps of the serving node update method according to the first aspect or the second aspect are implemented.

According to an eighth aspect, a terminal device is further provided, including a processor, a memory, and a computer program stored in the memory and capable of running on the processor, where the computer program is executed by the processor, the steps of the serving node update method according to the third aspect are implemented.

According to a ninth aspect, a computer-readable storage medium is further provided, where a computer program is stored in the computer-readable storage medium, and when the computer program is executed by a processor, the steps of the serving node update method according to the first aspect, the second aspect, or the third aspect are implemented.

In the embodiments of this disclosure, when the target node rejects the multi-connectivity serving node update, the multi-connectivity serving node update manner can fall back to the legacy serving node update manner, so as to ensure that the terminal device can change a serving node to meet service requirements of services.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. In addition, throughout the accompanying drawings, the same components are denoted by the same reference numerals. In the drawings.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The term "include" or any of its variants in the specification and claims of this application are intended to cover a non-exclusive inclusion, such that a process, a method, a system, a product, or a device that includes a series of steps or units not only includes those expressly listed steps or units but also includes other steps or units that are not expressly listed, or further includes elements inherent to such process, method, system, product, or device. In addition, in the specification and claims, the use of "and/or" represents presence of at least one of the connected objects, for example, "A and/or B" indicates that the following three cases: only A, only B, and both A and B. In the embodiments of this disclosure, terms such as "exemplary" or "for example" are used to represent an example, an instance, or an illustration. Any embodiment or design scheme described as "exemplary" or "for example" in the embodiments of this disclosure should not be construed as being more preferred or advantageous than other embodiments or design schemes. To be precise, the use of terms such as "exemplary" or "for example" is intended to present a related concept in a specific manner.

Figure 1:
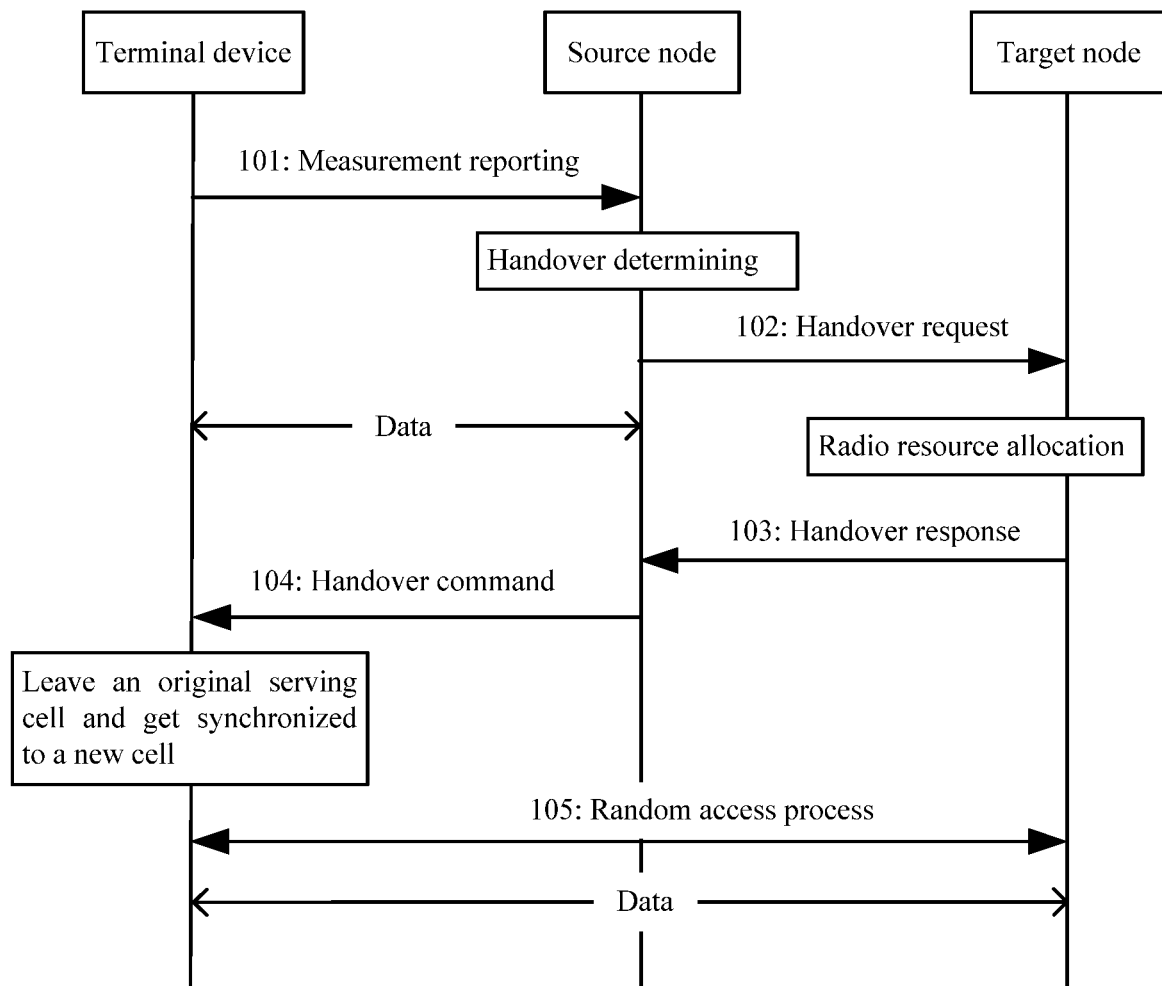
FIG. 1 is a schematic diagram of a handover process in the related art.

Referring to FIG. 1, main steps of a legacy handover process are as follows:

Step 101: A terminal device performs measurement based on a measurement configuration, and reports a measurement result to a source node.

Step 102: The source node determines a handover for the terminal device, and sends a handover request (HO Request) to a target node.

Step 103: The target node performs radio resource allocation, and includes a related resource configuration in a handover response (HO Response) and returns the handover response to the source node.

Step 104: The source node sends a handover command to the terminal device.

Step 105: The terminal device disconnects a radio resource control (RRC) connection from the source node, and initiates a random access process to the target node based on the cell resource configuration in the handover command.

2. Description of Dual Connectivity (DC)

In a fifth generation (5G) communications system, a DC architecture (including two cell groups, namely a master cell group (MCG) and a secondary cell group (SCG)) is used for terminal devices. The MCG corresponds to master nodes (MN) on the network side, and the SCG corresponds to secondary nodes (SN) on the network side. The MCG includes a primary cell (PCell) and a secondary cell (SCell), and the SCG includes: a PSCell and an SCell. The PCell and PSCell can also be collectively referred to as special cells (SpCel). Technologies described herein are not limited to a long term evolution (LTE)/LTE-Advanced (LTE-A) system, and can also be used in various wireless communications systems, such as code division multiple access (CDMA), time division multiple access (TDMA), frequency division multiple access (FDMA), orthogonal frequency division multiple access (OFDMA), and single-carrier frequency-division multiple access (SC-FDMA). The terms "system" and "network" are often used interchangeably. The CDMA system can implement radio technologies such as CDMA2000 and universal terrestrial radio access (UTRA). The UTRA includes wideband CDMA (WCDMA) and other CDMA variants. The TDMA system can implement radio technologies such as the global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation by the organization named "3rd Generation Partnership Project" (3GPP). The CDMA2000 and UMB are cited from descriptions of the documentation by the organization named "3rd Generation Partnership Project 2" (3GPP2). Techniques described in this specification can be used in the systems and radio technologies mentioned above, as well as other systems and radio technologies.

Figure 2:
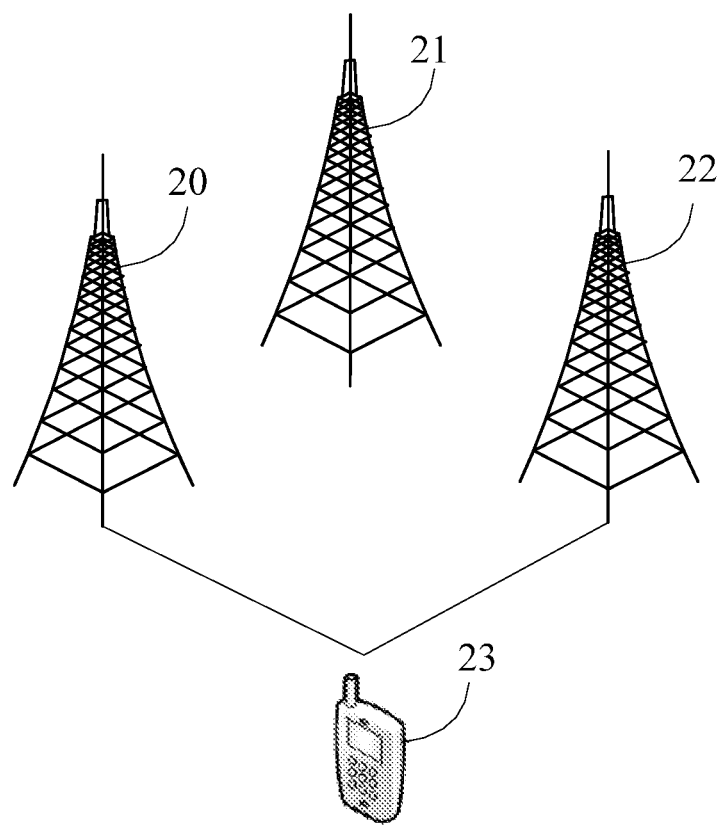
FIG. 2 is a schematic architectural diagram of a wireless communications system according to an embodiment of this disclosure.

The following describes the embodiments of this disclosure with reference to the accompanying drawings. A serving node update method and a device provided by the embodiments of this disclosure can be applied to a wireless communications system. Referring to FIG. 2, FIG. 2 is a schematic architectural diagram of a wireless communications system according to an embodiment of this disclosure. As shown in FIG. 2, the wireless communications system may include: a first network device 20, a second network device 21, a third network device 22, and a terminal device. For example, the terminal device is denoted as user equipment (UE) 23, The UE 23 may communicate (transmit signaling or transmit data) with the first network device 20, the second network device 21, and the third network device 22. In an actual application, connections between the foregoing devices may be wireless connections. To conveniently and intuitively represent a connection relationship between the devices, a solid line is used in FIG. 2. It should be noted that the foregoing communications system may include a plurality of UEs 23, and the first network device 20, the second network device 21, and the third network device 22 may communicate with the plurality of UEs 23.

The terminal device provided in the embodiments of this disclosure may be a mobile phone, a tablet computer, a notebook computer, an ultra-mobile personal computer (UMPC), a netbook, a personal digital assistant (PDA), a mobile Internet device (MID), a wearable device, an in-vehicle device, or the like.

The first network device 20, the second network device 21, and the third network device 22 provided in the embodiments of this disclosure may be base stations, and the base station may be a base station commonly used, or may be an evolved node base station (eNB), or may be a device in the 5G system, for example, a network device (such as a next generation node base station (gNB) or a transmission and reception point (TRP)).

Figure 3:
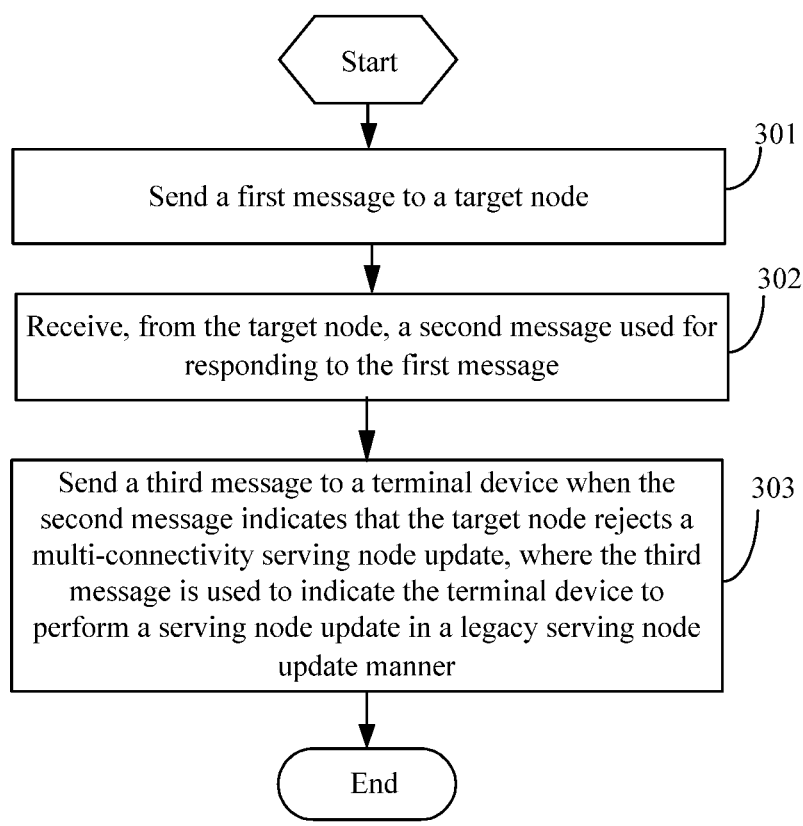
FIG. 3 is a flowchart 1 of a serving node update method according to an embodiment of this disclosure.

Referring to FIG. 3, an embodiment of this disclosure provides a serving node update method, applied to a first node. The first node may be a source node or a master node (MN). The specific steps are as follows:

Step 301: Send a first message to a target node.

The first message may also be referred to as a serving node update request message. The first message indicates that the first node requests to perform a serving node update in a multi-connectivity serving node update manner; or indicates that the first node requests to perform a serving node update in a legacy serving node update manner.

Step 302: Receive, from the target node, a second message used for responding to the first message.

The second message may also be referred to as a serving node update response message, and the second message may indicate that the target node rejects a multi-connectivity serving node update or the target node accepts the multi-connectivity serving node update. It can be understood that a multi-connectivity scenario in this embodiment of this disclosure includes, but is not limited to, a dual-connectivity scenario shown in FIG. 6, or may be multi-connectivity scenarios shown in FIG. 7 to FIG. 10, which are certainly not limited thereto.

Step 303: Send a third message to a terminal device when the second message indicates that the target node rejects the multi-connectivity serving node update, where the third message is used to indicate the terminal device to perform a serving node update in the legacy serving node update manner.

It can be understood that a fourth message is sent to the terminal device when the target node accepts the multi-connectivity serving node update, where the fourth message is used to indicate the terminal device to perform a serving node update in the multi-connectivity serving node update manner.

In other words, when the first node receives, from the target node, the second message indicating that the target node rejects the multi-connectivity serving node update, the first node sends, to the terminal device, the third message that indicates the terminal device to perform the serving node update in the legacy serving node update manner. When the first node receives, from the target node, the second message indicating that the target node accepts the multi-connectivity serving node update, the first node sends, to the terminal device, the fourth message that indicates the terminal device to perform the serving node update in the multi-connectivity serving node update manner. It should be noted that the third message and the fourth message may be the same message, or may be different messages.

The third message and the fourth message may also be referred to as a serving node update command. The serving node update command may be RRC reconfiguration signaling, and the serving node update command may include a cell resource configuration required for the serving node update, that is, a multi-connectivity cell resource configuration used for the multi-connectivity serving node update or a cell resource configuration used for the legacy serving node update.

In this embodiment of this disclosure, when the target node rejects the multi-connectivity serving node update, the multi-connectivity serving node update manner can fall back to the legacy serving node update manner, so as to ensure that the terminal device can change a serving node to meet service requirements of services.

It should be noted that the serving node update method shown in FIG. 3 may be applied to the following Scenario 1 to Scenario 5.

Scenario 1: The terminal device is configured with no SCG.

In Scenario 1, the first node is a source node. Optionally, after the source node receives, from the target node, the second message used for responding to the first message, the source node may release a configuration (this configuration may also be referred to as a multi-connectivity configuration) required for the multi-connectivity serving node update and reserved by the source node. It should be noted that reference may be made to Example 1 for a detailed procedure of Scenario 1, and details are not described herein again.

Scenario 2: The terminal device is configured with an SCG, and a configuration for the serving node update initiated by the source node is delivered by the master node.

In Scenario 2, the first node is a master node. Optionally, before the master node sends the first message to the target node, the master node may receive the first message from the source node. Optionally, after the master node receives, from the target node, the second message used for responding to the first message, the master node may notify the source node to release a reserved multi-connectivity configuration required for the multi-connectivity serving node update. It should be noted that reference may be made to Example 2 for a detailed procedure of Scenario 2, and details are not described herein again.

Scenario 3: The terminal device is configured with an SCG, and a configuration for the serving node update initiated by the source node is delivered by the source node.

In Scenario 3, the first node is a source node. Optionally, the source node may send the first message to the target node through the master node. The source node may receive, from the master node, the second message used for responding to the first message, where the second message is sent by the target node to the master node. It should be noted that reference may be made to Example 3 for a detailed procedure of Scenario 3, and details are not described herein again.

Scenario 4: The terminal device is configured with an SCG, and a configuration for the serving node update initiated by the master node is delivered by the master node.

In Scenario 4, the first node is a master node. It should be noted that reference may be made to Example 4 for a detailed procedure of Scenario 4, and details are not described herein again.

Scenario 5: The terminal device is configured with an SCG, and a configuration for the serving node update initiated by the master node is delivered by the source node.

In Scenario 5, the first node is a master node. Optionally, the master node may send the third message to the terminal device through the source node. It should be noted that reference may be made to Example 5 for a detailed procedure of Scenario 5, and details are not described herein again.

In this embodiment of this disclosure, optionally, the second message may include any one of the following: first information, where the first information indicates that the target node rejects the multi-connectivity serving node update; and second information, where the second information indicates that the target node accepts the multi-connectivity serving node update.

In this embodiment of this disclosure, optionally, when the second message includes the first information, the second message may also include any one or a combination of the following: third information, where the third information indicates a cell resource configuration used for a legacy serving node update; and fourth information, where the fourth information indicates a cause why the target node rejects the multi-connectivity serving node update.

In this embodiment of this disclosure, optionally, the cause why the target node rejects the multi-connectivity serving node update includes any one of the following: the target node does not support the multi-connectivity serving node update; and there is no radio resource available for the target node.

In this embodiment of this disclosure, optionally, when the second message includes the second information, the second message further includes any one or a combination of the following: fifth information, where the fifth information indicates a cell resource configuration used for the multi-connectivity serving node update; and sixth information, where the sixth information indicates a cell resource configuration to be used after the source node is released. After the cell configuration for the multi-connectivity serving node update (the cell configuration may also be called a multi-connectivity cell configuration) is applied to the terminal device, the terminal device is in an RRC connection to both the source node and the target node. If the source node needs to be released for the terminal device, another cell resource configuration is applied.

In this embodiment of this disclosure, optionally, the multi-connectivity cell resource configuration for the multi-connectivity serving node update may include any one or a combination of the following: a cell resource configuration sent by the source node, and a cell resource configuration configured by the target node.

In this embodiment of this disclosure, optionally, the first message includes one or more of the following:

seventh information, where the seventh information indicates a configuration (this configuration is also referred to as a multi-connectivity configuration) required for the multi-connectivity serving node update and reserved by the source node;

eighth information, where the eighth information indicates a request type of the first message, and the request type of the first message includes any one of the following: a multi-connectivity serving node update request and a legacy serving node update request. Optionally, the eighth information may be one-bit indication information. For example, when the eighth information has a value of "1", it indicates that a serving node update request sent by the source node is a multi-connectivity serving node update request; and when the eight information has a value of "0", it indicates that the serving node update request sent by the source node is a legacy serving node update request;

ninth information, where the ninth information indicates that the multi-connectivity serving node update manner is able to fall back to the legacy serving node update manner, or indicates that the multi-connectivity serving node update manner is not expected to fall back to the legacy serving node update manner. Optionally, the ninth information may be one-bit indication information. For example, when the ninth information has a value of "1", it indicates that the dual-connectivity serving node update is not expected (not intended) to fall back to the legacy serving node update manner. For example, for an ultra-reliable and low-latency communication (URLLC) service, the source node hopes to perform the serving node update based on multi-connectivity to ensure uninterrupted user-plane data. When the ninth information has a value of "0", it indicates that dual-connectivity serving node update can fall back to the legacy serving node update manner;

tenth information, where the tenth information indicates an access-stratum context of the terminal device;

eleventh information, where the eleventh information indicates an access-stratum configuration of the terminal device;

twelfth information, where the twelfth information indicates a measurement result reported by the terminal device; and thirteenth information, where the thirteenth information indicates a capability of the terminal device.

In this embodiment of this disclosure, when the terminal device with a multi-connectivity capability requires a serving node update, the source node and the target node may negotiate a serving node update manner. Specifically, the source node indicates whether the multi-connectivity serving node update can fall back to the legacy serving node update manner. When the target node does not support or reject the multi-connectivity serving node update, the multi-connectivity serving node update can fall back to the legacy serving node update manner, and a cause for rejecting the multi-connectivity serving node update is indicated, thereby ensuring that the terminal device can change a serving node to meet service requirements of the services.

Figure 4:
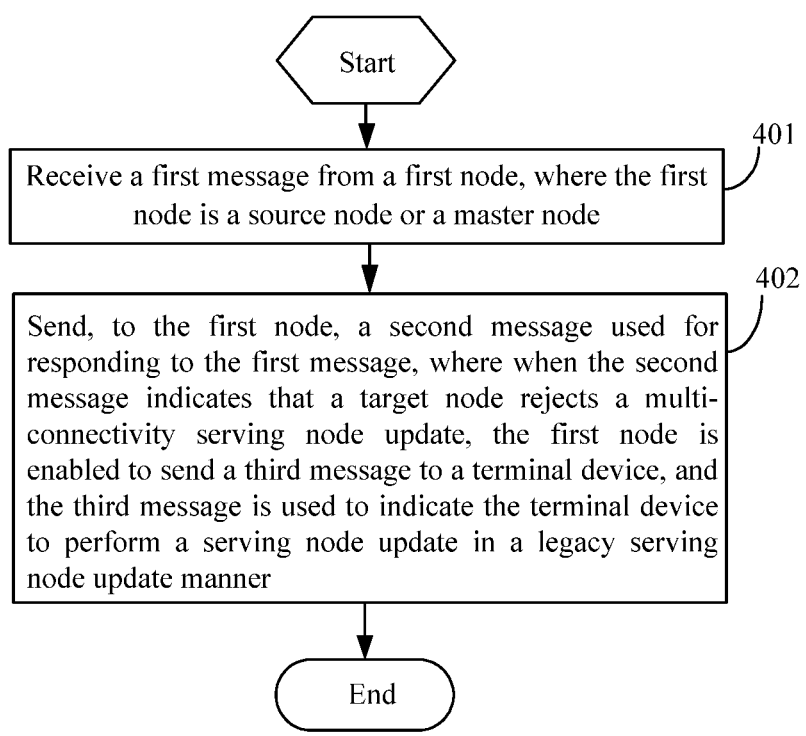
FIG. 4 is a flowchart 2 of a serving node update method according to an embodiment of this disclosure.

Referring to FIG. 4, an embodiment of this disclosure further provides a serving node update method, applied to a target node. Specific steps are as follows:

Step 401: Receive a first message from a first node, where the first node is a source node or a master node.

The first message indicates a request for the serving node update. For example, the first node requests, through the first message, to perform the serving node update in the legacy serving node update manner, or the first node requests, through the first message, to perform the serving node update in the multi-connectivity serving node update manner.

Step 402: Send, to the first node, a second message used for responding to the first message, where when the second message indicates that the target node rejects a multi-connectivity serving node update, the first node is enabled to send a third message to a terminal device, and the third message is used to indicate the terminal device to perform a serving node update in a legacy serving node update manner.

It should be noted that the serving node update method shown in FIG. 4 may be applied to the following Scenario 1 to Scenario 5.

Scenario 1: The terminal device is configured with no SCG.

In Scenario 1, the first node is a source node. It should be noted that reference may be made to Example 1 for a detailed procedure of Scenario 1, and details are not described herein again.

Scenario 2: The terminal device is configured with an SCG, and a configuration for the serving node update initiated by the source node is delivered by the master node.

In scenario 2, the first node is a master node. Optionally, the target node receives, through the master node, the first message sent by the source node. It should be noted that reference may be made to Example 2 for a detailed procedure of Scenario 2, and details are not described herein again.

Scenario 3: The terminal device is configured with an SCG, and a configuration for the serving node update initiated by the source node is delivered by the source node.

In Scenario 3, the first node is a source node. Optionally, the target node may receive, through the master node, the first message sent by the source node; and the target node may send, to the first node through the master node, the second message used for responding to the first message. It should be noted that reference may be made to Example 3 for a detailed procedure of Scenario 3, and details are not described herein again.

Scenario 4: The terminal device is configured with an SCG, and a configuration for the serving node update initiated by the master node is delivered by the master node.

In scenario 4, the first node is a master node. It should be noted that reference may be made to Example 4 for a detailed procedure of Scenario 4, and details are not described herein again.

Scenario 5: The terminal device is configured with an SCG, and a configuration for the serving node update initiated by the master node is delivered by the source node.

In scenario 5, the first node is a master node. It should be noted that reference may be made to Example 5 for a detailed procedure of Scenario 5, and details are not described herein again.

It should be noted that content of the first message and the second message in this embodiment of this disclosure is the same as content of the first message and the second message in the embodiment shown in FIG. 3, and details are not described herein again.

In this embodiment of this disclosure, when the target node rejects the multi-connectivity serving node update, the multi-connectivity serving node update manner can fall back to the legacy serving node update manner, so as to ensure that the terminal device can change a serving node to meet service requirements of services.

Figure 5:
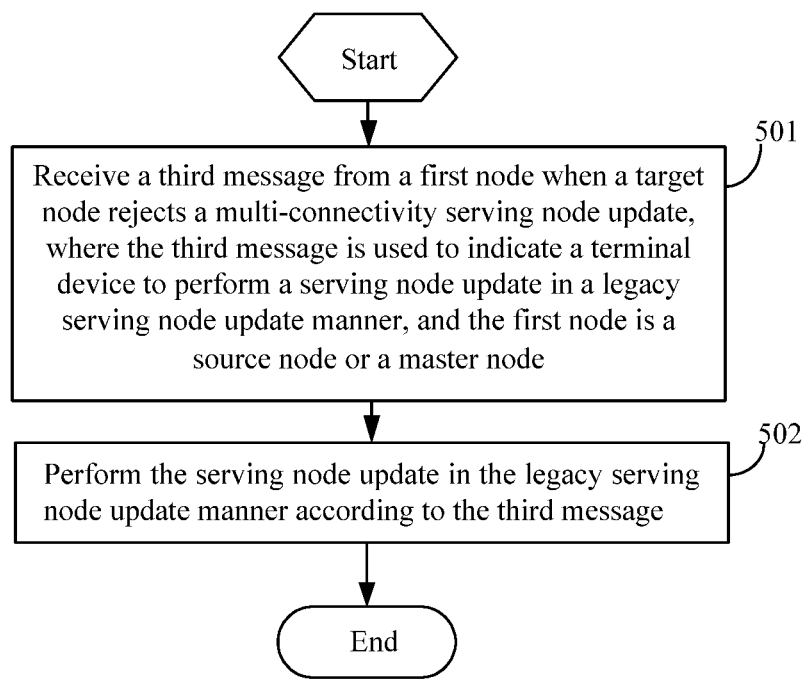
FIG. 5 is a flowchart 3 of a serving node update method according to an embodiment of this disclosure.

Referring to FIG. 5, an embodiment of this disclosure further provides a serving node update method, applied to a terminal device. Specific steps are as follows:

Step 501: Receive a third message from a first node when a target node rejects a multi-connectivity serving node update, where the third message is used to indicate the terminal device to perform a serving node update in a legacy serving node update manner, and the first node is a source node or a master node.

Step 502: Perform the serving node update in the legacy serving node update manner according to the third message.

In this embodiment of this disclosure, optionally, when the target node accepts the multi-connectivity serving node update, a fourth message is received from the first node, where the fourth message is used to indicate the terminal device to perform the serving node update in a multi-connectivity serving node update manner; and the serving node update is performed in the multi-connectivity serving node update manner according to the fourth message.

It should be noted that the third message and the fourth message may be the same message, or may be different messages.

The third message and the fourth message may also be referred to as a serving node update command. The serving node update command may be RRC reconfiguration signaling, and the serving node update command may include a cell resource configuration required for the serving node update, that is, a multi-connectivity cell resource configuration used for the multi-connectivity serving node update or a cell resource configuration used for the legacy serving node update.

It should be noted that the serving node update method shown in FIG. 4 may be applied to the following Scenario 1 to Scenario 5.

Scenario 1: The terminal device is configured with no SCG.

In Scenario 1, the first node is a source node. It should be noted that reference may be made to Example 1 for a detailed procedure of Scenario 1, and details are not described herein again.

Scenario 2: The terminal device is configured with an SCG, and a configuration for the serving node update initiated by the source node is delivered by the master node.

In scenario 2, the first node is a master node. It should be noted that reference may be made to Example 2 for a detailed procedure of Scenario 2, and details are not described herein again.

Scenario 3: The terminal device is configured with an SCG, and a configuration for the serving node update initiated by the source node is delivered by the source node.

In Scenario 3, the first node is a source node. It should be noted that reference may be made to Example 3 for a detailed procedure of Scenario 3, and details are not described herein again.

Scenario 4: The terminal device is configured with an SCG, and a configuration for the serving node update initiated by the master node is delivered by the master node.

In scenario 4, the first node is a master node. It should be noted that reference may be made to Example 4 for a detailed procedure of Scenario 4, and details are not described herein again.

Scenario 5: The terminal device is configured with an SCG, and a configuration for the serving node update initiated by the master node is delivered by the source node.

In scenario 5, the first node is a master node. It should be noted that reference may be made to Example 5 for a detailed procedure of Scenario 5, and details are not described herein again.

In this embodiment of this disclosure, optionally, the fourth message may include fourteenth information and fifteenth information, where the fourteenth information indicates a cell resource configuration to be used after the source node is released, and the fifteenth information indicates a cell resource configuration used for the multi-connectivity serving node update. The terminal device stores the fourteenth information, and initiates a random access process to the target node based on the fifteenth information.

In this embodiment of this disclosure, optionally, after the random access process is initiated to the target node based on the fifteenth information, the RRC connection to the source node is disconnected, and corresponding processing is performed based on the fourteenth information, for example, applying the cell resource configuration to be used after the source node is released.

In this embodiment of this disclosure, optionally, the third message may include sixteenth information, where the sixteenth information indicates the cell resource configuration used in the legacy serving node update manner. In step 502, the terminal device disconnects the RRC connection from the source node, and initiates a random access process to the target node based on the sixteenth information.

In this embodiment of this disclosure, when the target node rejects the multi-connectivity serving node update, the multi-connectivity serving node update manner can fall back to the legacy serving node update manner, so as to ensure that the terminal device can change a serving node to meet service requirements of services.

EXAMPLE 1

The terminal device is configured with no SCG.

Figure 6:
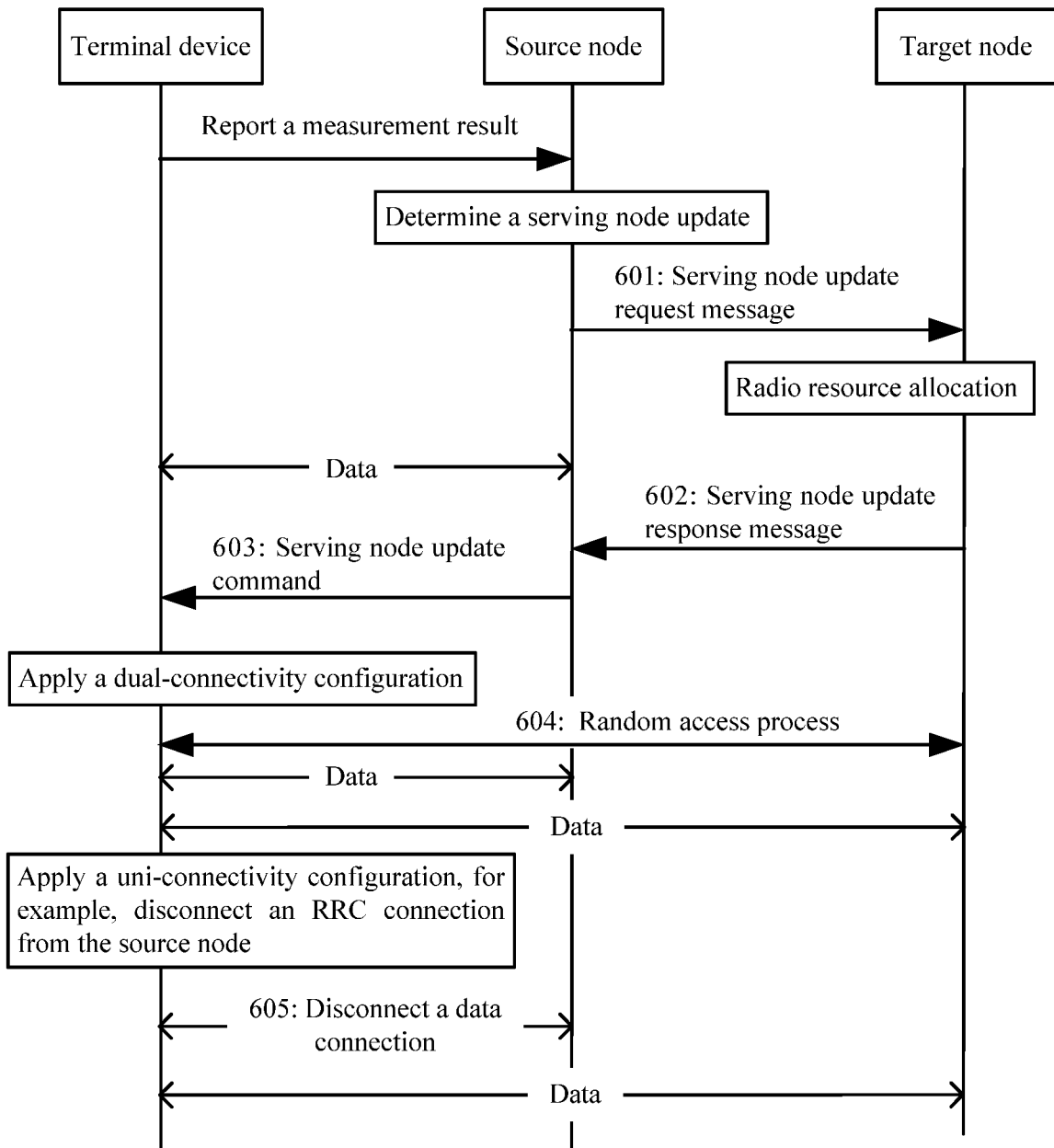
FIG. 6 is a flowchart 4 of a serving node update method according to an embodiment of this disclosure.

Referring to FIG. 6, an embodiment of this disclosure provides a serving node update process, and specific steps are as follows.

Step 601: A source node sends a serving node update request message to a target node.

The source node may also be referred to as a source serving node, the target node may also be referred to as a target serving node, and the serving node update request message may also be referred to as a first message.

It can be understood that, in a dual-connectivity serving node update process used in this example, the serving node update request message in step 601 is equivalent to a handover request message. It can also be understood that multi-connectivity in this example can be construed as dual-connectivity.

Optionally, content contained in the serving node update request message may be any one or a combination of the following:

(1) seventh information, indicating a multi-connectivity configuration required for a multi-connectivity serving node update and reserved by the source node. For example, the seventh information may be MCG configuration information required for a dual-connectivity configuration (MCG configuration of DC configuration);

(2) eighth information, indicating a type of a serving node update request. Optionally, the eighth information may be one-bit indication information. For example, when the eighth information has a value of "1", it indicates that the serving node update request sent by the source node is a multi-connectivity serving node update request; when the eighth information has a value of "0", it indicates that the serving node update request sent by the source node is a legacy serving node update request;

(3) ninth information, indicating whether the multi-connectivity serving node update can fall back to the legacy serving node update manner. Optionally, the ninth information may be one-bit indication information. For example, when the ninth information has a value of "1", it indicates that the dual-connectivity serving node update is not expected (not intended) to fall back to the legacy serving node update manner. For example, for an ultra-reliable and low-latency communication (URLLC) service, the source node hopes to perform the serving node update based on multi-connectivity to ensure uninterrupted user-plane data. When the ninth information has a value of "0", it indicates that dual-connectivity serving node update can fall back to the legacy serving node update manner;

(4) tenth information, indicating an access-stratum context of UE (UE AS context);

(5) eleventh information, indicating access-stratum configuration information of the UE (UE AS context);

(6) twelfth information, indicating a measurement result reported by the UE; and (7) thirteenth information, indicating a capability of the UE.

Step 602: The target node sends a serving node update response (SN change Response) message to the source node.

The serving node update response message may also be referred to as a second message.

Optionally, content included in the serving node update response may be any one of the following:

first information, indicating that the target node rejects the multi-connectivity serving node update; and second information, indicating that the target node accepts (or agrees on) the dual-connectivity serving node update.

Optionally, if the target node rejects the multi-connectivity serving node update, the serving node update response may further include the following additional information:

third information, indicating a cell resource configuration used for a legacy serving node update; and fourth information, indicating a cause why the target node rejects the multi-connectivity serving node update.

Optionally, the cause for rejecting the dual-connectivity serving node update may include but is not limited to any one of the following:

the target node does not support the dual-connectivity serving node update; and there is no radio resource available for the target node.

Optionally, if the target node accepts the dual-connectivity serving node update, the serving node update response may further include the following additional information:

fifth information, indicating a cell resource configuration used for the multi-connectivity serving node update manner and the following content may be included: configuration information sent by the source node (for example, MCG configuration information required for dual-connectivity), and configuration information configured by the target node (for example, SCG configuration information required for dual-connectivity); and sixth information, indicating a cell resource configuration to be used after the source node is released.

Step 603: The source node receives the serving node update response sent by the target node, and delivers a serving node update command to the terminal device.

The serving node update command may be RRC reconfiguration signaling, and the serving node update command may include the cell resource configuration required for the serving node update, that is, a multi-connectivity cell resource configuration used for the multi-connectivity serving node update or a cell resource configuration used for the legacy serving node update.

Optionally, the source node may also perform the following action: releasing the configuration required for the multi-connectivity serving node update and reserved by the source node, for example, the MCG configuration required for dual-connectivity configuration.

Step 604: The terminal device receives the serving node update command delivered by the source node, and a corresponding action of the terminal device may include any one of the following:

if the serving node update command includes the resource configuration for the multi-connectivity service node, the action of the terminal device may include: storing a cell resource configuration that is carried in the multi-connectivity service update command and that is to be used after the source node is released, and using the multi-connectivity resource configuration included in the multi-connectivity serving node update command to initiate a random access process to the target node; and if the serving node update command includes the resource configuration for the legacy serving node update, the action of the terminal device action may include: disconnecting an RRC connection from the source node, and using the cell resource configuration indicated by the serving node update command to initiate a random access process to the target node.

Optionally, if the terminal device uses the multi-connectivity serving node update, after the terminal device executes the multi-connectivity resource configuration in the multi-connectivity serving node update command, the method may further include step 605.

Step 605: Disconnect the RRC connection from the source node; or apply the cell resource configuration that is carried in the multi-connectivity serving node update command and that is to be used after the source node is released.

EXAMPLE 2

The terminal device is configured with an SCG, and a configuration for the serving node update initiated by the source node (SN) is delivered by the master node (MN).

Figure 7:
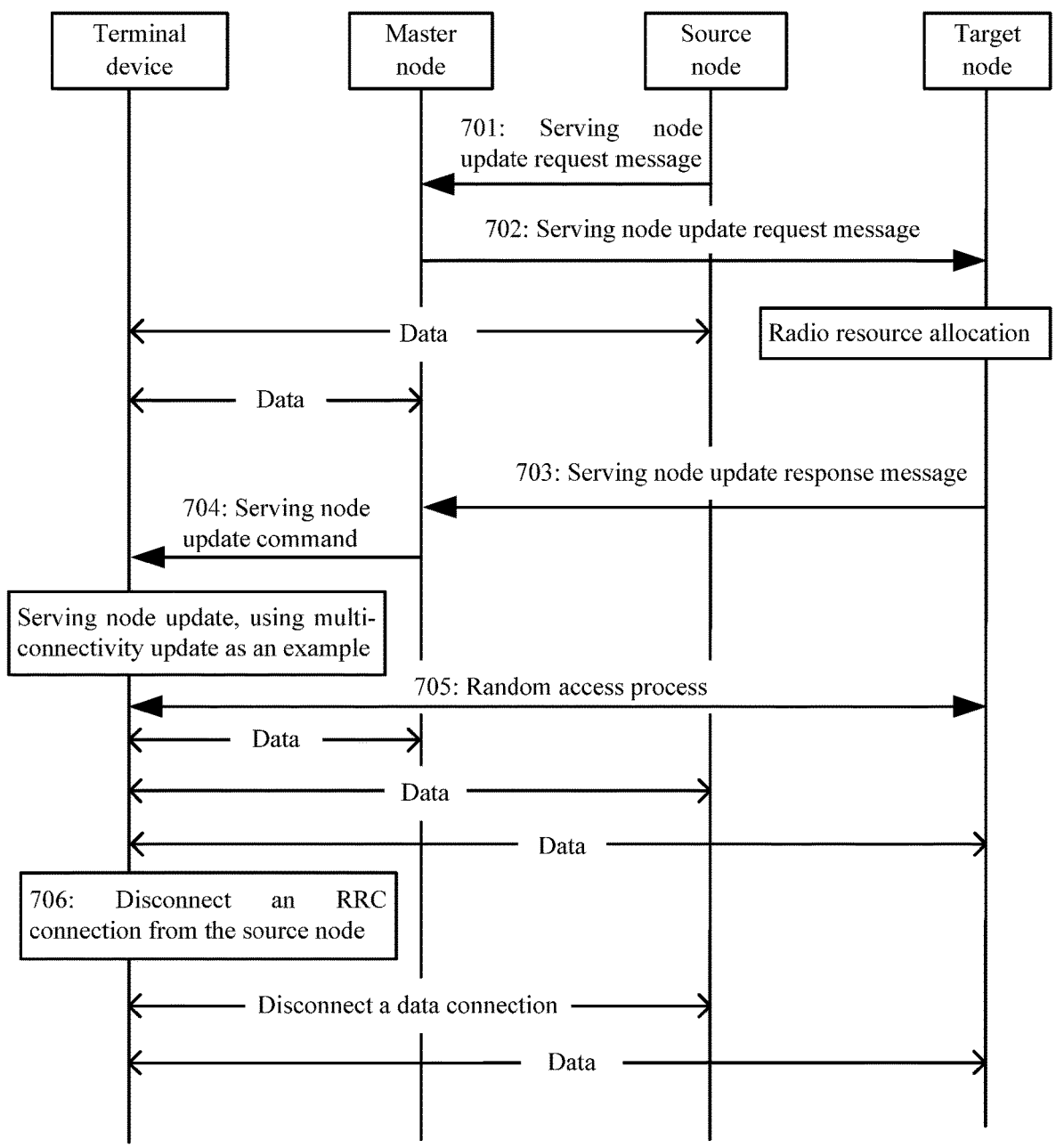
FIG. 7 is a flowchart 5 of a serving node update method according to an embodiment of this disclosure.

Referring to FIG. 7, an embodiment of this disclosure provides a process in which a configuration for a serving node update initiated by a source node is delivered by a master node. Specific steps are as follows:

Step 701: The source node sends a serving node update request message to the master node.

The serving node update request message may also be referred to as a first message.

It can be understood that, in this example, the serving node update request message is equivalent to an SN change request message.

Content contained in the serving node update request is the same as the content contained in the serving node update request in step 601 shown in FIG. 6, and details are not described herein again.

Step 702: The master node sends the serving node update request message to the target node.

Step 703: The target node sends a serving node update response message to the master node.

It can be understood that content of step 703 is the same as content of step 602 shown in FIG. 6, and details are not described herein again.

Step 704: The master node receives a serving node update command sent by the target node, and delivers the serving node update command to the terminal device.

The serving node update command may be RRC reconfiguration signaling, and the serving node update command may include the cell resource configuration required for the serving node update, that is, a multi-connectivity cell resource configuration used for the multi-connectivity serving node update or a cell resource configuration used for the legacy serving node update.

Optionally, the master node indicates the source node to release the reserved configuration required for the multi-connectivity serving node update.

It can be understood that content of steps 705 and 706 is the same as the content of steps 604 and 605 shown in FIG. 6, and details are not described herein again.

EXAMPLE 3

The terminal device is configured with an SCG, and a configuration for the serving node update initiated by the source node is delivered by the source node.

Figure 8:
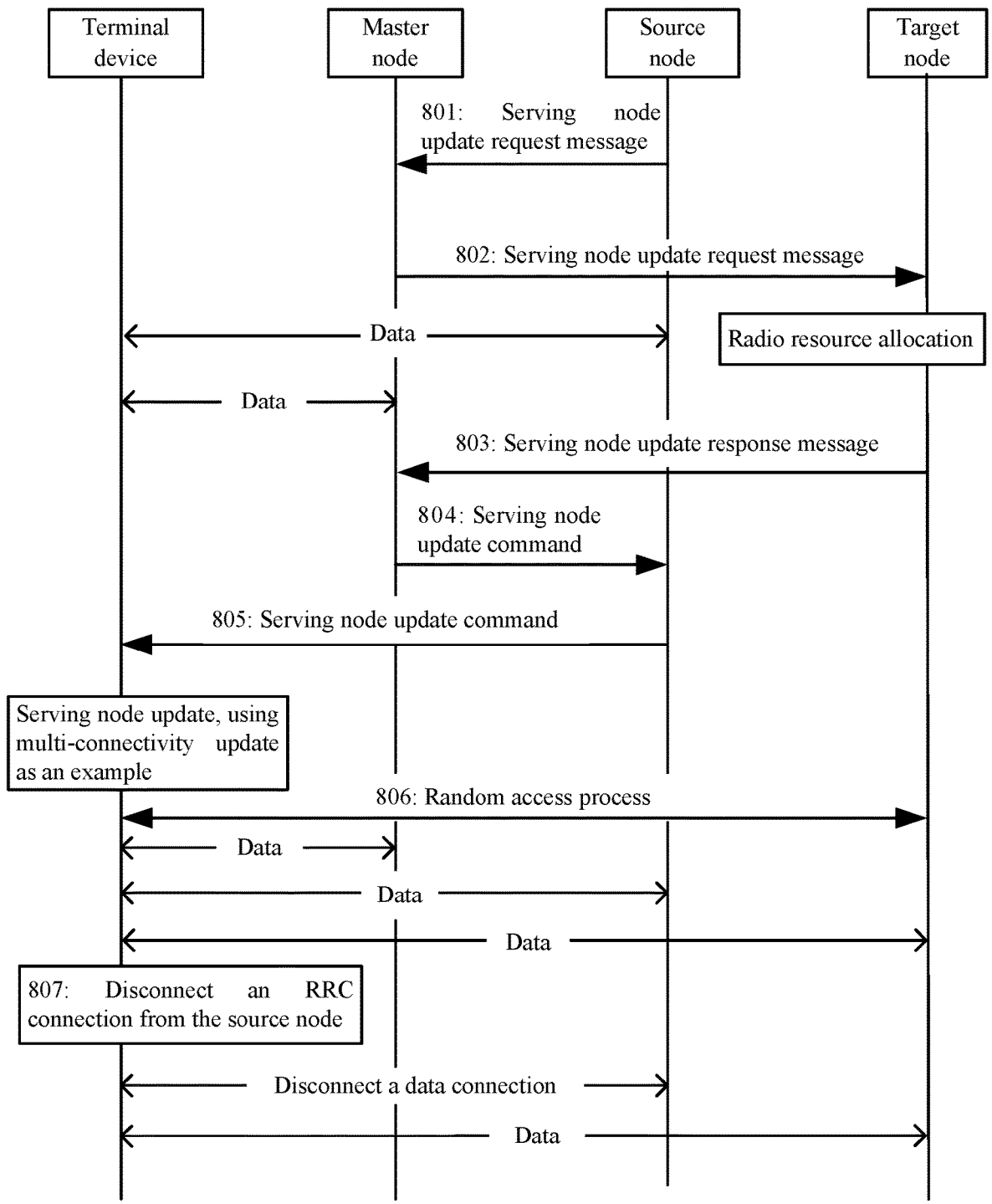
FIG. 8 is a flowchart 6 of a serving node update method according to an embodiment of this disclosure.

Referring to FIG. 8, an embodiment of this disclosure provides a process in which a configuration for a serving node update initiated by a source node is delivered by the source node. Specific steps are as follows:

Step 801: The source node sends a serving node update request message to the master node.

It can be understood that, in this example, the serving node update request message is equivalent to an SN change request message.

Content contained in the serving node update request is the same as the content contained in the serving node update request in step 601 shown in FIG. 6, and details are not described herein again.

Step 802: The master node sends the serving node update request message to the target node.

Step 803: The target node sends a serving node update response message to the master node.

It can be understood that content of step 803 is the same as content of step 602 shown in FIG. 6, and details are not described herein again.

Step 804: The master node sends a serving node update command to the source node.

The serving node update command may be RRC reconfiguration signaling, and the serving node update command may include the cell resource configuration required for the serving node update, that is, a multi-connectivity cell resource configuration used for the multi-connectivity serving node update or a cell resource configuration used for the legacy serving node update.

Step 805: The source node delivers the serving node update command to the terminal device.

It can be understood that specific content of step 805 is the same as content of step 603 shown in FIG. 6, and details are not described herein again.

It can be understood that content of steps 806 and 807 is the same as the content of steps 604 and 605 shown in FIG. 6, and details are not described herein again.

EXAMPLE 4

The terminal device is configured with an SCG, and a configuration for the serving node update initiated by the master node is delivered by the master node.

Figure 9:
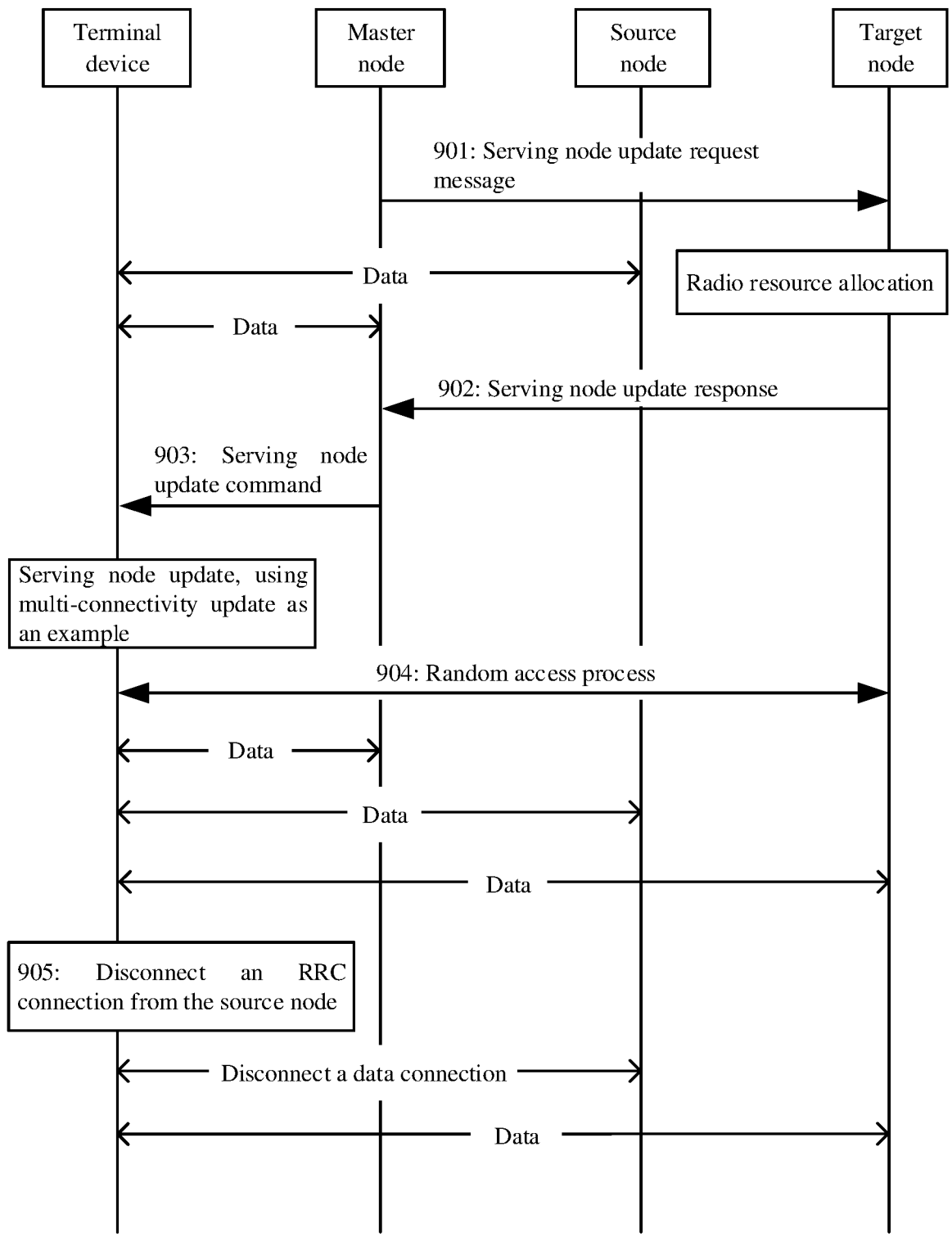
FIG. 9 is a flowchart 7 of a serving node update method according to an embodiment of this disclosure.

Referring to FIG. 9, an embodiment of this disclosure provides a process in which a configuration for a serving node update initiated by a master node is delivered by the master node. Specific steps are as follows:

Step 901: The master node sends a serving node update request message to the target node.

It can be understood that, in this example, the serving node update request message is equivalent to an SN change request message.

Content contained in the serving node update request is the same as the content contained in the serving node update request in step 601 shown in FIG. 6, and details are not described herein again.

Step 902: The target node sends a serving node update response to the master node.

It can be understood that content of step 902 is the same as content of step 602 shown in FIG. 6, and details are not described herein again.

Step 903: The master node delivers a serving node update command to the terminal device.

The serving node update command may be RRC reconfiguration signaling, and the serving node update command may include the cell resource configuration required for the serving node update, that is, a multi-connectivity cell resource configuration used for the multi-connectivity serving node update or a cell resource configuration used for the legacy serving node update.

It can be understood that content of steps 904 and 905 is the same as the content of steps 604 and 605 shown in FIG. 6, and details are not described herein again.

EXAMPLE 5

The terminal device is configured with an SCG, and a configuration for the serving node update initiated by the master node is delivered by the source node.

Figure 10:
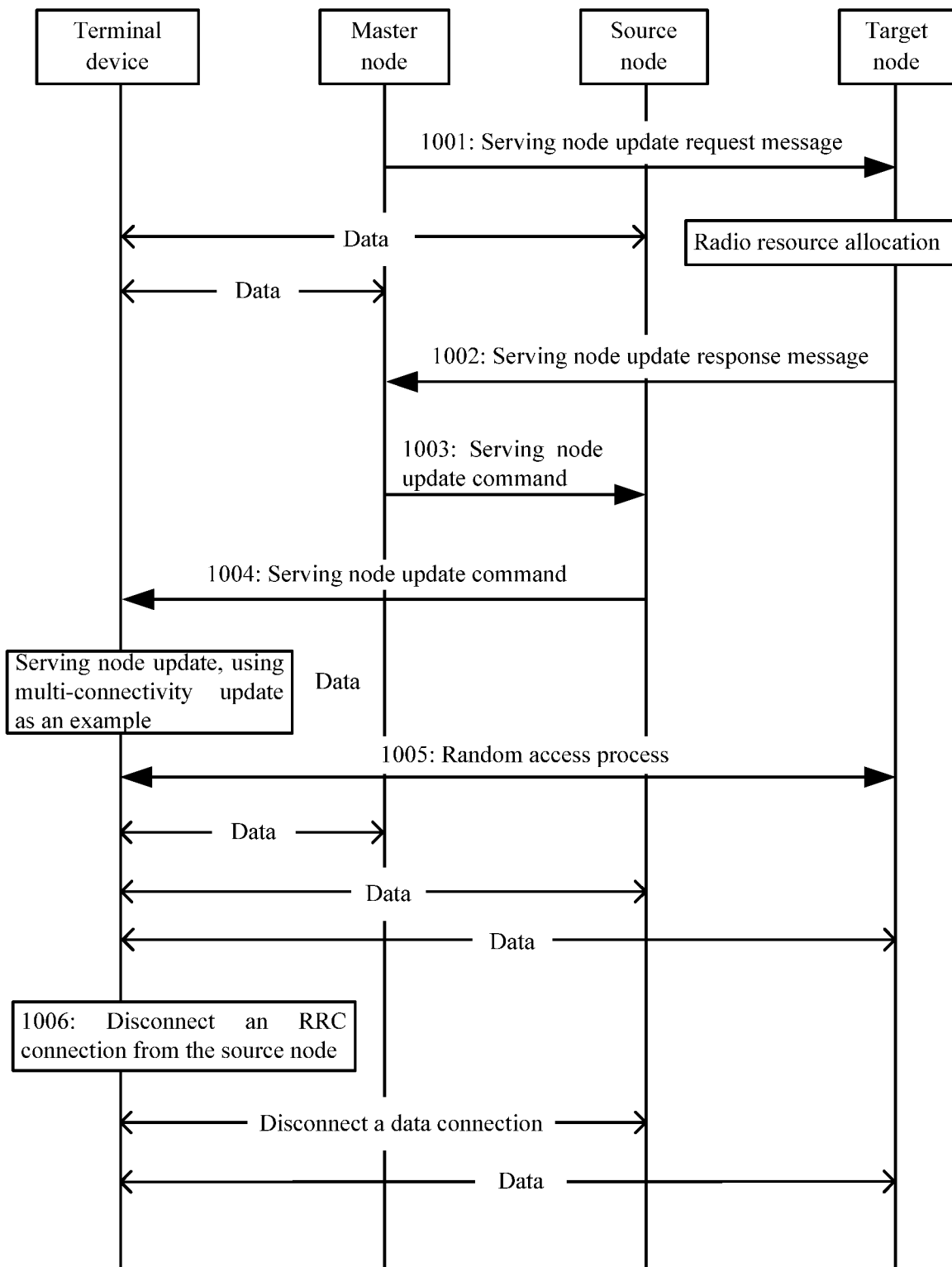
FIG. 10 is a flowchart 8 of a serving node update method according to an embodiment of this disclosure.

Referring to FIG. 10, an embodiment of this disclosure provides a process in which a configuration for a serving node update initiated by a master node is delivered by a source node. Specific steps are as follows:

Step 1001: The master node sends a serving node update request message to the target node.

It can be understood that, in this example, the serving node update request message is equivalent to an SN change request message.

Content contained in the serving node update request is the same as the content contained in the serving node update request in step 601 shown in FIG. 6, and details are not described herein again.

Step 1002: The target node sends a serving node update response to the master node.

It can be understood that content of step 1002 is the same as content of step 602 shown in FIG. 6, and details are not described herein again.

Step 1003: The master node sends a serving node update command to the source node.

The serving node update command may be RRC reconfiguration signaling, and the serving node update command may include the cell resource configuration required for the serving node update, that is, a multi-connectivity cell resource configuration used for the multi-connectivity serving node update or a cell resource configuration used for the legacy serving node update.

Step 1004: The source node receives and delivers the serving node update command to the terminal device.

It can be understood that content of steps 1005 and 1006 is the same as the content of steps 604 and 605 shown in FIG. 6, and details are not described herein again.

An embodiment of this disclosure further provides a first node. A problem resolving principle of the first node is similar to the serving node update methods in the embodiments of this disclosure. Therefore, for implementation of the first node, reference may be made to the implementation of the method, and details are not described herein again.

Figure 11:
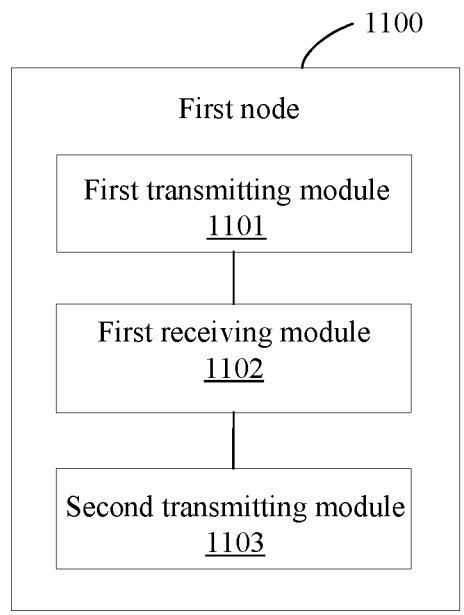
FIG. 11 is a structural diagram of a first node according to an embodiment of this disclosure.

Referring to FIG. 11, an embodiment of this disclosure further provides a first node, where the first node 1100 is a source node or a master node, and the first node 1100 includes:

a first transmitting module 1101, configured to send a first message to a target node;

a first receiving module 1102, configured to receive, from the target node, a second message used for responding to the first message; and a second transmitting module 1103, configured to send a third message to a terminal device when the second message indicates that the target node rejects a multi-connectivity serving node update, where the third message is used to indicate the terminal device to perform a serving node update in a legacy serving node update manner.

In this embodiment of this disclosure, optionally, the second transmitting module 1103 is further configured to send a fourth message to the terminal device when the second message indicates that the target node accepts the multi-connectivity serving node update, where the fourth message is used to indicate the terminal device to perform a serving node update in a multi-connectivity serving node update manner.

In this embodiment of this disclosure, optionally, the first node is a source node, and the first node further includes:

a first releasing module, configured to release a configuration required for the multi-connectivity serving node update and reserved by the source node.

In this embodiment of this disclosure, optionally, the first node further includes:

a second receiving module, configured to receive the first message from the source node.

In this embodiment of this disclosure, optionally, the first node further includes:

a third transmitting module, configured to notify the source node to release a reserved configuration required for the multi-connectivity serving node update.

In this embodiment of this disclosure, optionally, the first node is a source node, and the first transmitting module is further configured to: send the first message to the target node through the master node.

The first receiving module is further configured to: receive, from the master node, a second message used for responding to the first message, where the second message is sent by the target node to the master node.

In this embodiment of this disclosure, optionally, the first node is a master node, and the second transmitting module is further configured to: send the third message to the terminal device through the source node.

In this embodiment of this disclosure, optionally, the second message includes any one of the following:

first information, where the first information indicates that the target node rejects the multi-connectivity serving node update; and second information, where the second information indicates that the target node accepts the multi-connectivity serving node update.

In this embodiment of this disclosure, optionally, when the second message includes the first information, the second message further includes any one or a combination of the following:

third information, where the third information indicates a cell resource configuration used for a legacy serving node update; and fourth information, where the fourth information indicates a cause why the target node rejects the multi-connectivity serving node update.

In this embodiment of this disclosure, optionally, the cause why the target node rejects the multi-connectivity serving node update includes any one of the following:

the target node does not support the multi-connectivity serving node update; and there is no radio resource available for the target node.

In this embodiment of this disclosure, optionally, when the second message includes the second information, the second message further includes any one or a combination of the following:

fifth information, where the fifth information indicates a cell resource configuration used for the multi-connectivity serving node update; and sixth information, where the sixth information indicates a cell resource configuration to be used after the source node is released.

In this embodiment of this disclosure, optionally, the cell resource configuration for the multi-connectivity serving node update includes any one or a combination of the following:

a cell resource configuration sent by the source node; and a cell resource configuration configured by the target node.

In this embodiment of this disclosure, optionally, the first message includes one or more of the following:

seventh information, where the seventh information indicates a configuration required for the multi-connectivity serving node update and reserved by the source node;

eighth information, where the eighth information indicates a request type of the first message, and the request type of the first message includes any one of the following: a multi-connectivity serving node update request and a legacy serving node update request;

ninth information, where the ninth information indicates that the multi-connectivity serving node update manner is able to fall back to the legacy serving node update manner, or indicates that the multi-connectivity serving node update manner is not expected to fall back to the legacy serving node update manner;

tenth information, where the tenth information indicates an access-stratum context of the terminal device;

eleventh information, where the eleventh information indicates an access-stratum configuration of the terminal device;

twelfth information, where the twelfth information indicates a measurement result reported by the terminal device; and thirteenth information, where the thirteenth information indicates a capability of the terminal device.

The first node provided in this embodiment of this disclosure can execute the foregoing method embodiments, implementation principles and technical effects thereof are similar, and details are not described herein again in this embodiment.

An embodiment of this disclosure further provides a target node. A problem resolving principle of the target node is similar to the serving node update method in the embodiments of this disclosure. Therefore, for implementation of the target node, reference may be made to the implementation of the method, and details are not described herein again.

Figure 12:
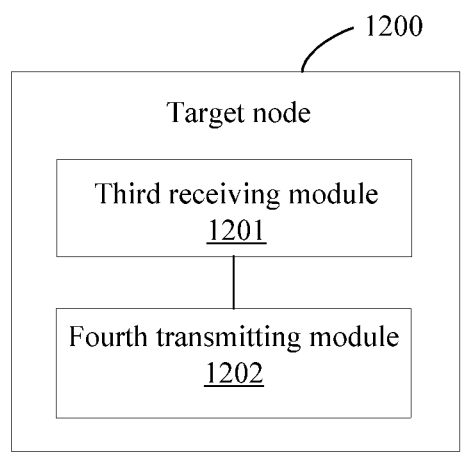
FIG. 12 is a structural diagram of a target node according to an embodiment of this disclosure.

Referring to FIG. 12, an embodiment of this disclosure further provides a target node, and the target node 1200 includes:

a third receiving module 1201, configured to receive a first message from a first node, where the first node is a source node or a master node; and a fourth transmitting module 1202, configured to send, to the first node, a second message used for responding to the first message, where when the second message indicates that the target node rejects a multi-connectivity serving node update, the first node is enabled to send a third message to a terminal device, and the third message is used to indicate the terminal device to perform a serving node update in a legacy serving node update manner.

In this embodiment of this disclosure, optionally, the first node is a master node, and the third receiving module is further configured to: receive, through the master node, the first message sent by the source node.

In this embodiment of this disclosure, optionally, the first node is a source node, and the third receiving module is further configured to: receive, through the master node, the first message sent by the source node.

The fourth transmitting module is further configured to send, to the first node through the master node, the second message for responding to the first message.

In this embodiment of this disclosure, optionally, the second message includes any one of the following:

first information, where the first information indicates that the target node rejects the multi-connectivity serving node update; and second information, where the second information indicates that the target node accepts the multi-connectivity serving node update.

In this embodiment of this disclosure, optionally, when the second message includes the first information, the second message further includes any one or a combination of the following:

third information, where the third information indicates a cell resource configuration used for a legacy serving node update; and fourth information, where the fourth information indicates a cause why the target node rejects the multi-connectivity serving node update.

In this embodiment of this disclosure, optionally, the cause why the target node rejects the multi-connectivity serving node update includes any one of the following:

the target node does not support the multi-connectivity serving node update; and there is no radio resource available for the target node.

In this embodiment of this disclosure, optionally, when the second message includes the second information, the second message further includes any one or a combination of the following:

fifth information, where the fifth information indicates a cell resource configuration used for the multi-connectivity serving node update; and sixth information, where the sixth information indicates a cell resource configuration to be used after the source node is released.

In this embodiment of this disclosure, optionally, the cell resource configuration for the multi-connectivity serving node update manner includes any one or a combination of the following:

a multi-connectivity cell resource configuration sent by the source node; and a multi-connectivity cell resource configuration configured by the target node.

In this embodiment of this disclosure, optionally, the first message includes one or more of the following:

seventh information, where the seventh information indicates a configuration required for the multi-connectivity serving node update and reserved by the source node;

eighth information, where the eighth information indicates a request type of the first message, and the request type of the first message includes any one of the following: a multi-connectivity serving node update request and a legacy serving node update request;

ninth information, where the ninth information indicates that the multi-connectivity serving node update manner is able to fall back to the legacy serving node update manner, or indicates that the multi-connectivity serving node update manner is not expected to fall back to the legacy serving node update manner;

tenth information, where the tenth information indicates an access-stratum context of the terminal device;

eleventh information, where the eleventh information indicates an access-stratum configuration of the terminal device;

twelfth information, where the twelfth information indicates a measurement result reported by the terminal device; and thirteenth information, where the thirteenth information indicates a capability of the terminal device.

The target node provided in this embodiment of this disclosure can execute the foregoing method embodiments, implementation principles and technical effects thereof are similar, and details are not described herein again in this embodiment.

An embodiment of this disclosure further provides a terminal device. A problem resolving principle of the terminal device is similar to the serving node update method in the embodiments of this disclosure. Therefore, for implementation of the terminal device, reference may be made to the implementation of the method, and details are not described herein again.

Figure 13:
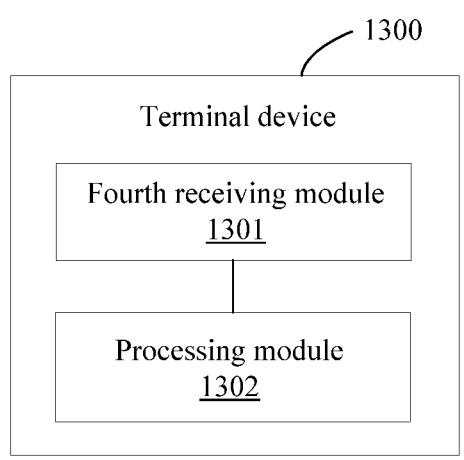
FIG. 13 is a structural diagram 1 of a terminal device according to an embodiment of this disclosure.

Referring to FIG. 13, an embodiment of this disclosure further provides a terminal device, and the terminal device 1300 includes:

a fourth receiving module 1301, configured to: receive a third message from a first node when a target node rejects a multi-connectivity serving node update, where the third message is used to indicate the terminal device to perform a serving node update in a legacy serving node update manner; and a processing module 1302, configured to perform a serving node update according to the third message in the legacy serving node update manner.

In this embodiment of this disclosure, optionally, the fourth receiving module 1301 is further configured to: receive a fourth message from the first node when the target node accepts the multi-connectivity serving node update, where the fourth message is used to indicate the terminal device to perform a serving node update in a multi-connectivity serving node update manner.

The processing module 1302 is further configured to perform a serving node update in the multi-connectivity serving node update manner according to the fourth message.

In this embodiment of this disclosure, optionally, the fourth message includes fourteenth information and fifteenth information, where the fourteenth information indicates a cell resource configuration to be used after the source node is released, and the fifteenth information indicates a cell resource configuration used for the multi-connectivity serving node update manner.

The processing module is further configured to store the fourteenth information, and initiate a random access process to the target node based on the fifteenth information.

In this embodiment of this disclosure, optionally, the processing module is further configured to: disconnect the radio resource control RRC connection from the source node, and perform corresponding processing based on the fourteenth information.

In this embodiment of this disclosure, optionally, the third message includes sixteenth information, where the sixteenth information indicates a cell resource configuration used for the legacy serving node update manner.

The processing module is further configured to: disconnect the RRC connection from the source node and initiate a random access process to the target node based on the sixteenth information.

The terminal device provided in this embodiment of this disclosure can execute the foregoing method embodiments, implementation principles and technical effects thereof are similar, and details are not described herein again.

Figure 14:
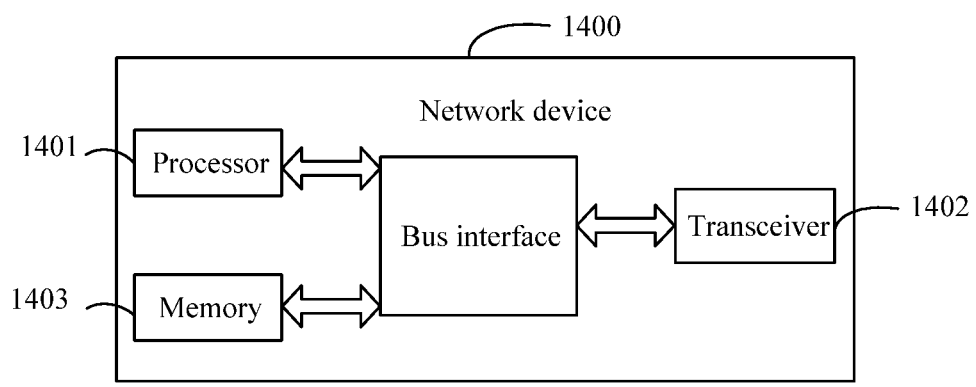
FIG. 14 is a structural diagram of a network device according to an embodiment of this disclosure.

Referring to FIG. 14, FIG. 14 is a structural diagram of a network device applied to an embodiment of this disclosure. As shown in FIG. 14, the network device 1400 includes: a processor 1401, a transceiver 1402, a memory 1403, and a bus interface.

In an embodiment of this disclosure, the network device 1400 further includes: a computer program stored in the memory 1403 and capable of running on the processor 1401. When the computer program is executed by the processor 1401, the following steps are implemented: sending a first message to a target node; receiving, from the target node, a second message used for responding to the first message; and sending a third message to a terminal device when the second message indicates that the target node rejects a multi-connectivity serving node update, where the third message is used to indicate the terminal device to perform a serving node update in a legacy serving node update manner.

In another embodiment of this disclosure, the network device 1400 further includes: a computer program stored in the memory 1403 and capable of running on the processor 1401. When the computer program is executed by the processor 1401, the following steps are implemented: receiving a first message from a first node, where the first node is a source node or a master node; and sending, to the first node, a second message used for responding to the first message, where when the second message indicates that the target node rejects a multi-connectivity serving node update, the first node is enabled to send a third message to a terminal device, and the third message is used to indicate the terminal device to perform a serving node update in a legacy serving node update manner.

In FIG. 14, a bus architecture may include any quantity of interconnected buses and bridges, and specifically connects together circuits that are of one or more processors represented by the processor 1401 and of a memory represented by the memory 1403. The bus architecture may further connect together various other circuits such as a peripheral device, a voltage stabilizer, and a power management circuit. These are well known in the art, and therefore are not further described in this specification any more. The bus interface provides interfaces. The transceiver 1402 may be a plurality of components, including a transmitter and a receiver, and provides units for communicating with a variety of other apparatuses on a transmission medium.

The processor 1401 is responsible for management of the bus architecture and general processing, and the memory 1403 is capable of storing data that is used by the processor 1401 during operation.

The network device provided in this embodiment of this disclosure can execute the foregoing method embodiments, implementation principles and technical effects thereof are similar, and details are not described herein again.

Figure 15:
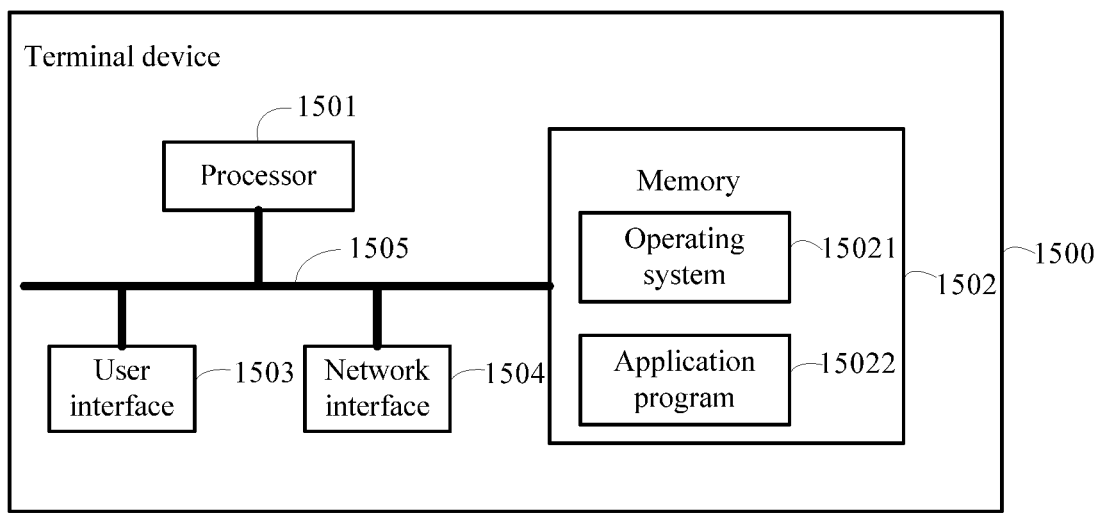
FIG. 15 is a structural diagram 2 of a terminal device according to an embodiment of this disclosure.

As shown in FIG. 15, the terminal device 1500 shown in FIG. 15 includes at least one processor 1501, a memory 1502, at least one network interface 1504, and a user interface 1503. The components of the user equipment 1500 are coupled together by using the bus system 1505. It can be understood that the bus system 1505 is configured to implement connection communication between these components. The bus system 1505 may include not only a data bus but also a power supply bus, a control bus, and a status signal bus. However, for clear description, various buses in FIG. 15 are marked as the bus system 1505.

The user interface 1503 may include a display, a keyboard, a click device (for example, a mouse or a trackball), a touch board, or a touchscreen.

It can be understood that the memory 1502 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and serves as an external cache. As exemplary rather than restrictive description, many forms of RAM can be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (Synchlink DRAM, SLDRAM), and a direct Rambus random access memory (DRRAM). The memory 1502 in the system and method described in the embodiments of this disclosure is intended to include but is not limited to these and any other suitable types of memories.

In some implementations, the memory 1502 stores the following elements: an executable module or a data structure, or a subset thereof, or an extended set thereof: an operating system 15021 and an application program 15022.

The operating system 15021 includes various system programs, such as a framework layer, a kernel library layer, and a driver layer, and is configured to implement various basic services and process hardware-based tasks. The application program 15022 includes various application programs, such as a media player, and a browser, and is configured to implement various application services. A program that implements the methods of the embodiments of this disclosure may be included in the application program 15022.

In an embodiment of this disclosure, a program or an instruction stored in the memory 1502, specifically, a program or an instruction stored in the application program 15022 is invoked, and the following steps are implemented during execution: when a target node rejects a multi-connectivity serving node update, receiving a third message from a first node, where the third message is used to indicate the terminal device to perform a serving node update in a legacy serving node update manner; and performing a serving node update in the legacy serving node update manner according to the third message.

The user equipment provided in this embodiment of this disclosure can execute the foregoing method embodiments, implementation principles and technical effects thereof are similar, and details are not described herein again.

The steps of the method or algorithm described with reference with content disclosed in this disclosure may be implemented in a hardware manner, or may be implemented in a manner in which a processor executes software instructions. A software instruction may include corresponding software module, and the software module may be stored in a RAM, a flash memory, a ROM, an EPROM, an EEPROM, a register, a hard disk, a removable hard disk, a compact disc read-only memory, or any other form of storage medium well known in the art. An exemplary storage medium is coupled to the processor, so that the processor can read information from the storage medium and write information into the storage medium. Certainly, the storage medium may also be a component of the processor. The processor and the storage medium may be located in an ASIC. In addition, the ASIC may be located in a core network interface device. Certainly, the processor and the storage medium may be located in the core-network interface device as discrete components. An exemplary storage medium is coupled to the processor, so that the processor can read information from the storage medium and can write information to the storage medium. Certainly, the storage medium may also be an integral part of the processor. The processor and the storage medium may be located in the ASIC. In addition, the ASIC may be located in the core network interface device. Certainly, the processor and storage medium can also exist as discrete components in the core network interface device.

A person of skill in the art should be able to realize that in one or more of the foregoing examples, the functions described in this disclosure may be implemented by using hardware, software, firmware, or any combination thereof. When this disclosure is implemented by using software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this disclosure are further described in detail in the foregoing specific embodiments. It should be understood that the foregoing descriptions are only specific embodiments of this disclosure, but are not intended to limit the protection scope of this disclosure. Any modification, equivalent replacement, or improvement made within the spirit and principle of this disclosure shall fall within the protection scope of this disclosure.

A person skilled in the art should understand that the embodiments of this disclosure may be provided as a method, a system, or a computer program product. Therefore, the embodiments of this disclosure may use a form of hardware only embodiments, software only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer-usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the embodiments of this disclosure without departing from the spirit and scope of this disclosure. This disclosure is intended to cover these modifications and variations provided that the modifications and variations in the embodiments of this disclosure fall within the protection scope defined by the following claims and their equivalent technologies.

What is claimed is:

1. A serving node update method, applied to a first node, wherein the first node is a source node or a master node, and the method comprises:
   sending a first message to a target node;
   receiving, from the target node, a second message used for responding to the first message; and
   sending a third message to a terminal device when the second message indicates that the target node rejects a multi-connectivity serving node update, wherein the third message is used to indicate the terminal device to perform a serving node update in a legacy serving node update manner.

2. The method according to claim 1, wherein the method further comprises:
   sending a fourth message to the terminal device when the second message indicates that the target node accepts the multi-connectivity serving node update, wherein the fourth message is used to indicate the terminal device to perform a serving node update in a multi-connectivity serving node update manner.

3. The method according to claim 1, wherein the first node is a source node, and after the receiving, from the target node, a second message used for responding to the first message, the method further comprises:
   releasing a configuration required for the multi-connectivity serving node update and reserved by the source node.

4. The method according to claim 1, wherein the first node is a master node, and before the sending a first message to a target node, the method further comprises:
   receiving the first message from a source node.

5. The method according to claim 4, wherein after the receiving, from the target node, a second message used for responding to the first message, the method further comprises:
   notifying the source node to release a reserved configuration required for the multi-connectivity serving node update.

6. The method according to claim 1, wherein the first node is a source node, and the sending a first message to a target node comprises:
   sending the first message to the target node through a master node; and
   the receiving, from the target node, a second message used for responding to the first message comprises:
   receiving, from the master node, the second message used for responding to the first message, wherein the second message is sent by the target node to the master node.

7. The method according to claim 1, wherein the first node is a master node, and the sending a third message to a terminal device comprises:
   sending the third message to the terminal device through a source node.

8. The method according to claim 1, wherein the second message comprises any one of the following:
   first information, wherein the first information indicates that the target node rejects the multi-connectivity serving node update; and
   second information, wherein the second information indicates that the target node accepts the multi-connectivity serving node update.

9. The method according to claim 8, wherein when the second message comprises the first information, the second message further comprises any one or a combination of the following:
- third information, wherein the third information indicates a cell resource configuration used for a legacy serving node update; and
- fourth information, wherein the fourth information indicates a cause why the target node rejects the multi-connectivity serving node update.

10. The method according to claim 9, wherein the cause why the target node rejects the multi-connectivity serving node update comprises any one of the following:
- the target node does not support the multi-connectivity serving node update; and
- there is no radio resource available for the target node.

11. The method according to claim 8, wherein when the second message comprises the second information, the second message further comprises any one or a combination of the following:
- fifth information, wherein the fifth information indicates a cell resource configuration used for the multi-connectivity serving node update; and
- sixth information, wherein the sixth information indicates a cell resource configuration to be used after the source node is released.

12. The method according to claim 11, wherein the cell resource configuration used for the multi-connectivity serving node update comprises any one or a combination of the following:
- a cell resource configuration sent by the source node; and
- a cell resource configuration configured by the target node.

13. The method according to claim 1, wherein the first message comprises one or more of the following:
- seventh information, wherein the seventh information indicates a configuration required for the multi-connectivity serving node update and reserved by the source node;
- eighth information, wherein the eighth information indicates a request type of the first message, and the request type of the first message comprises any one of the following: a multi-connectivity serving node update request and a legacy serving node update request;
- ninth information, wherein the ninth information indicates that the multi-connectivity serving node update manner is able to fall back to the legacy serving node update manner, or indicates that the multi-connectivity serving node update manner is not expected to fall back to the legacy serving node update manner;
- tenth information, wherein the tenth information indicates an access-stratum context of the terminal device;
- eleventh information, wherein the eleventh information indicates an access-stratum configuration of the terminal device;
- twelfth information, wherein the twelfth information indicates a measurement result reported by the terminal device; and
- thirteenth information, wherein the thirteenth information indicates a capability of the terminal device.

14. A serving node update method, applied to a target node, wherein the method comprises:
- receiving a first message from a first node, wherein the first node is a source node or a master node; and
- sending, to the first node, a second message used for responding to the first message, wherein when the second message indicates that the target node rejects a multi-connectivity serving node update, the first node is enabled to send a third message to a terminal device, and the third message is used to indicate the terminal device to perform a serving node update in a legacy serving node update manner.

15. The method according to claim 14, wherein the first node is a master node, and the receiving a first message from a first node comprises:
- receiving, through the master node, the first message sent by a source node.

16. The method according to claim 14, wherein the first node is a source node, and the receiving a first message from a first node comprises:
- receiving, through a master node, the first message sent by the source node; and
- the sending, to the first node, a second message used for responding to the first message comprises:
- sending, to the first node through the master node, the second message used for responding to the first message.

17. A serving node update method, applied to a terminal device, wherein the method comprises:
- receiving a third message from a first node when a target node rejects a multi-connectivity serving node update, wherein the third message is used to indicate the terminal device to perform a serving node update in a legacy serving node update manner; and
- performing a serving node update in the legacy serving node update manner according to the third message.

18. A network device, comprising a processor, a memory, and a computer program stored in the memory and capable of running on the processor, wherein when the computer program is executed by the processor, the steps of the serving node update method according to claim 1 are implemented.

19. A network device, comprising a processor, a memory, and a computer program stored in the memory and capable of running on the processor, wherein when the computer program is executed by the processor, the steps of the serving node update method according to claim 14 are implemented.

20. A terminal device, comprising a processor, a memory, and a computer program stored in the memory and capable of running on the processor, wherein the computer program is executed by the processor, the steps of the serving node update method according to claim 17 are implemented.

* * * * *